United States Patent Office 2,740,796
Patented Apr. 3, 1956

2,740,796

ACID WOOL DYESTUFFS OF THE ANTHRAQUINONE SERIES

Josef Singer, Heinz-Werner Schwechten, and Otto Bayer, Leverkusen-Bayerwerk, Germany, assignors to Farbenfabriken Bayer Aktiengesellschaft, Leverkusen, Germany No Drawing. Application April 8, 1953,
Serial No. 347,616

Claims priority, application Germany April 18, 1952

13 Claims. (Cl. 260—371)

The present invention relates to new acid wool dyestuffs of the anthraquinone series and to a process of producing such dyestuffs.

In accordance with the invention we have found that valuable new acid wool dyestuffs are obtained by reacting 1-amino-4-bromo-anthraquinone-2-sulfonic acid and hydroaromatic diamines containing at least one amino group attached to the hydrogenated nucleus so that only one amino group of the diamines takes part in the reaction. Examples of diamines containing from 6 to at most 12 cyclic carbon atoms and containing no olefinic double bonds are hexahydrophenylene diamines and their derivatives containing alkyl groups attached to the nucleus, hexahydro-and perhydro-diamino-diphenyls such as hexahydro-benzidine and perhydro-benzidine, tetrahydro- and dekahydro-naphthylene diamines such as dekahydro-1.5-naphthylene-diamine, hexahydro- and perhydro-diamino-diphenylmethanes, and hexahydro - amino-diphenyl-amines. Suitable monoacyl derivatives are the reaction products of the said diamines and acylating agents such as carboxylic acid chlorides, sulfochlorides and heterocyclic halogen compounds which react like acid chlorides, for instance cyanuric chloride.

When the reaction is performed with non-acylated diamines, products containing a free amino group are obtained, which are either acylated subsequently, or into which alkyl radicals containing sulfonic acid groups are introduced for instance by reaction with $\beta$-chloro-ethane sulfonic acid or butane sulfone. These acylated dyestuffs may also be obtained by reacting 1-amino-4-bromoanthraquinone-2-sulfonic acid and the monoacyl derivatives of the above mentioned diamines. If the diamines employed in the reaction contain a non-hydrogenated aromatic nucleus (for instance hexahydrobenzidine and tetrahydronaphthylene-diamines), sulfonic acid groups may be introduced into the resulting dyestuff. In this case it is of advantage to introduce the acyl groups after sulfonation.

It is also within the scope to produce the new acid wool dyestuffs by reacting 1-amino-2.4-dibromo-anthraquinone and the above said diamines and replacing the bromine in 2-position by the sulfonic acid group by treatment with sulfite.

The compounds obtained according to the invention represent valuable wool dyestuffs, especially those which carry a free amino group and, therefore, permit to carry out a variety of reactions leading to dyestuffs which possess dyeing properties varying within a wide range while the clear shade and fastness to light of the dyeings obtained therewith are preserved. This offers the possibility to produce dyestuffs yielding clear dyeings which are fast to light and having for instance good levelling strength, good affinity for the fiber when dyeing from a neutral bath, respectively, and good fastness to milling. For instance, by introducing acetyl groups into the product prepared by reacting hexahydro - p-phenylene-diamine and 1-amino-4-bromo-anthraquinone-2-sulfonic acid a wool dyestuff is obtained which, besides equal clearness and fastness to light of the dyeings produced from the reaction product from hexahydroaniline and 1 - amino-4-bromoanthraquinone-2-sulfonic acid, is distinguished by excellent levelling properties. On the other hand, the wool dyestuff prepared similarly by acylation with the acyl chloride of 3-carboxy-benzene-sulfonic acid-2'.5'-dichloroanilide shows a good affinity for the wool fiber when dyeing from a neutral bath and good fastness to milling. It is further possible to introduce acyl radicals which allow to perform further reactions. For instance, by treatment with diketene, aceto-acetyl derivatives are obtained, which can be coupled with diazo compounds; furthermore, acid radicals containing chromable groups may be employed, which allow to produce chrome dyestuffs.

The new dyestuffs obtained according to the invention correspond to the formula

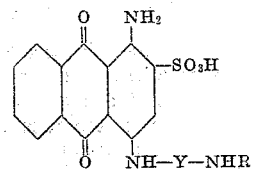

wherein:

R means H, R'CO, R'SO$_2$, R'NHCO and R"SO$_3$H,
R' being alkyl, aryl, cycloalkyl,
R" being alkyl, and
Y means a hydrogenated aromatic radical containing no olefinic double bonds, the 4-amino-anthraquinone group being attached to a hydrogenated nucleus of said radical Y; Y shall contain from 6 to 12 cyclic carbon atoms; in particular Y stands for

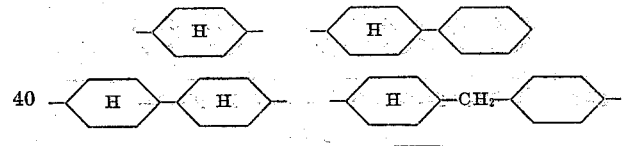

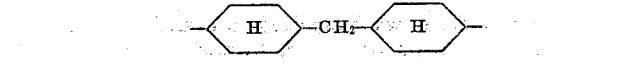

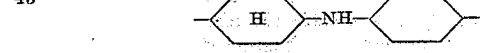

and

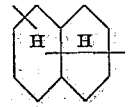

the aromatic nuclei of said radicals may contain a sulfonic acid group as substituent.

The new dyestuffs are distinguished in general by very good solubility; the dyeings produced therefrom are extra-ordinarily clear and very fast to light. They are suitable inter alia for dyeing wool, silk and other animal fibers as well as for dyeing synthetic fibers such as fibers from polyamides.

The invention is further illustrated by the following examples without being restricted thereto, the parts being by weight.

Example 1

40 parts of the sodium salt of 1-amino-4-bromo-anthraquinone-2-sulfonic acid, 25 parts of hexahydro-p-phenylene-diamine, 5 parts of sodium hydroxide and 1.5 parts of cuprous chloride are mixed with stirring in 200 parts of water at 50–70° C. for some time. After completion of the reaction the solution is adjusted weakly acid, the precipitated dyestuff is isolated and washed with hot water. The product is purified by dissolving in 1500 parts of water and 10 parts of sodium hydroxide, reprecipitated by neutralization, isolated and washed with hot water.

Upon addition of sodium chloride the sodium salt of the dyestuff is separated from the alkaline solution. When dyeing with the addition of levelling agents the dyestuff yields on wool clear reddish-blue shades.

Example 2

21 parts of the dyestuff obtained as described in Example 1 are dissolved in 350 parts of water and 7 parts of acetic anhydride until acetylation is complete. The reaction product is separated by addition of sodium chloride, suction filtered, washed with sodium chloride solution and dried.

The blue dyestuff obtained is excellently soluble in water and possesses excellent levelling properties, good coloring strength and good fastness to light.

By analogous treatment of the reaction product prepared from 1-amino-4-bromo-anthraquinone-2-sulfonic acid and hexahydro-p-phenylene-diamine with propionic anhydride a dyestuff with similar properties is obtained.

By treatment with hexahydrobenzoyl-chloride a dyestuff is obtained which, as compared with the acetyl derivative, shows an improved fastness to wet processing and is very suitable for dyeing in the cold.

When undecylenic acid chloride is employed as acylating agent a dyestuff is obtained which is suitable for dyeing from a neutral bath. Furthermore the chlorides of 3-carboxy-benzene-sulfonic acid-2'.5'-dichloroanilide of 3-carboxy - benzene-sulfonic acid-2'.4'.5'-trichloroanilide, 3-carboxy-benzene-sulfonic acid-2'.5'-dichloroanilide of carboxy-benzene-3.5-disulfonic acid dianilide and of p-isooctyl-phenoxyacetic acid may be used as acylating agents, yielding dyestuffs with similar properties.

Example 3

21 parts of the dyestuff obtained as described in Example 1 and 6 parts of sodium hydroxide are mixed with stirring at room temperature in 600 parts of water with 15 parts of diphenyl-4-sulfochloride.

The reaction is completed by heating to about 40° C.; the solution is then neutralized and the resulting diphenylsulfamide is isolated by addition of sodium chloride.

The dyestuff of Example 1 may be acylated in analogous manner with other sulfochlorides such as p-toluenesulfochloride, 4-chlorobenzene-sulfochloride, 3-nitrobenzene-sulfochloride naphthalene-1- or 2-sulfochloride and anthraquinone-2-sulfochloride. In all these cases dyestuffs having good affinity for the wool fiber are obtained; some of the resulting dyestuffs may be used for dyeing from a neutral bath.

Example 4

42 parts of the dyestuff obtained as described in Example 1, 10 parts of sodium hydroxide and 15 parts of soda are reacted with ice cooling in 600 parts of water with 40 parts of the sodium salt of naphthalene-2-sulfochloride-sulfonic acid (prepared according to Example 1 of German Patent 719,598). After completion of the reaction and isolation as usual an easily levelling dyestuff of good fastness to wet processing is obtained.

Example 5

3 parts of the dyestuff obtained as described in Example 1 are dissolved in 100 parts of n/5-sodium hydroxide solution and intensely stirred for some time with a solution of 1 part of phenyl isocyanate in 5 parts of acetone and little pyridine. The acetone is then distilled off and the residue is isolated as usual by addition of salt. A readily levelling blue wool dyestuff is obtained.

Example 6

20 parts of the sodium salt of 1-amino-4-bromo-anthraquinone-2-sulfonic acid and 15 parts of hexahydrobenzidine are heated to the boil while stirring in 300 parts of water and 100 parts of ethanol with 1 part of copper sulfate and 10 parts of sodium carbonate.

The reaction product precipitates in the form of blue needles. When the reaction is complete the mixture is cooled, adjusted weakly acid and the dyestuff is isolated.

The dyestuff can be purified by redissolution from 500 parts of water and 4 parts of sodium hydroxide.

The dyestuff dyes wool in clear greenish-blue shades, as described in Example 1.

By acetylation an easily levelling dyestuff dyeing wool in greenish-blue shades is obtained.

By sulfonation with concentrated sulfuric acid or weak fuming sulfuric acid a levelling dyestuff is obtained, which is fast to milling. By acetylating this sulfonated product a readily levelling wool dyestuff of good fastness to light is obtained.

Example 7

20 parts of the sodium salt of 1-amino-4-bromo-anthraquinone-2-sulfonic acid and 20 parts of dekahydronaphthalene-1.5-diamine are mixed with stirring at 50° C. in 200 parts of water with 1 part of cuprous chloride and 3 parts of sodium hydroxide until the presently occurring blue coloration no longer changes. The dyestuff formed is isolated and, if necessary, purified according to Example 1.

After acylation as described in the preceding examples valuable blue dyestuffs having different dyeing properties are obtained.

Example 8

10 parts of the sodium salt of 1-amino-4-bromo anthraquinone-2-sulfonic acid and 10 parts of 4.4'-(diaminocyclohexyl)-methyl-methane are heated in 100 parts of water and 40 parts of methanol with 1 part of copper sulfate and 1.5 parts of sodium hydroxide to 70–75° C. for some hours.

When the blue coloration occurring soon no longer changes the dyestuff formed is precipitated by neutralizing with mineral or acetic acid and purified according to Example 1.

By acetylation a blue wool dyestuff is obtained which yields dyeings fast to wet processing and which may be dyed from a neutral bath.

We claim:

1. New compounds of the general formula

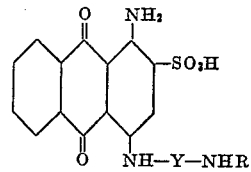

wherein R stands for a radical selected from the group consisting of H and acyl, and Y stands for a hydrogenated aromatic radical containing from 6 to at most 12 cyclic carbon atoms and being free from olefinic double bonds, the 4-aminoanthraquinone group being attached to a hydrogenated nucleus of said radical Y.

2. New compounds of the general formula

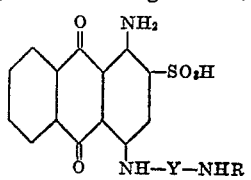

wherein R stands for a radical selected from the group consisting of H and acyl, and Y stands for a radical selected from the group consisting of

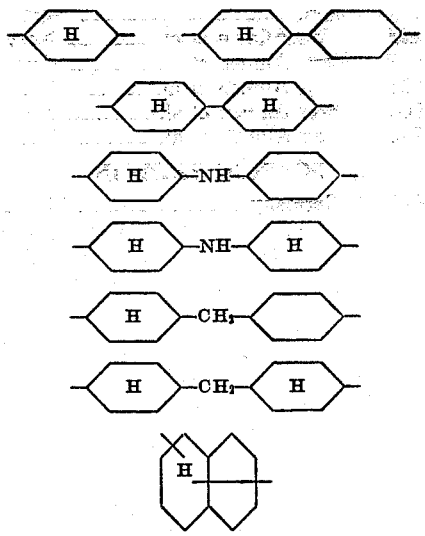

and

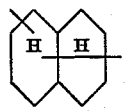

the 4-amino anthraquinone group being attached to a hydrogenated nucleus of said radical Y.

3. As new compound

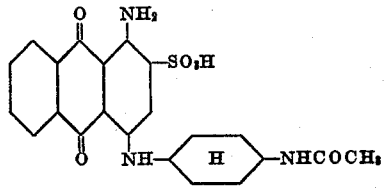

4. As new compound

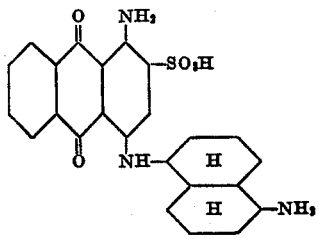

5. As new compound

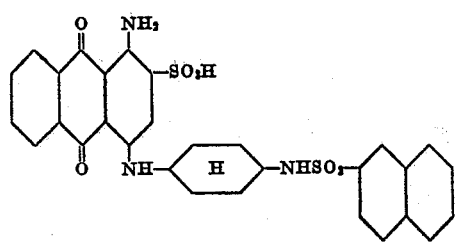

6. As new compound

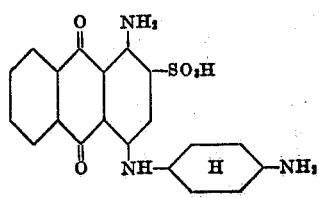

7. As new compound

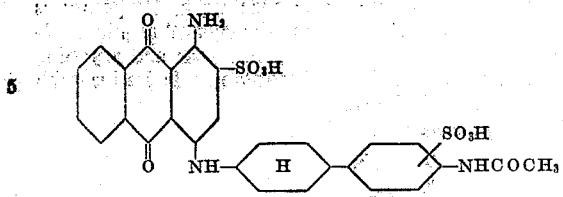

8. The process for the production of new anthraquinone compounds comprising reacting at temperatures up to about 100° C. 1-amino-4-bromoanthraquinone-2-sulfonic acid with a compound of the general formula $H_2N-Y-NH_2$ 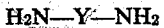

wherein Y stands for a hydrogenated aromatic radical containing from 6 to at most 12 cyclic carbon atoms and being free from olefinic double bonds.

9. The process for the production of new anthraquinone compounds comprising reacting at temperatures up to about 100° C. 1-amino-4-bromoanthraquinone-2-sulfonic acid with a compound of the general formula $H_2N-Y-NH_2$ 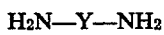

wherein Y stands for a hydrogenated aromatic radical containing from 6 to at most 12 cyclic carbon atoms and being free from olefinic double bonds, acylating the obtained 1.4-diamino-anthraquinone derivatives with a compound selected from the group consisting of carboxylic acid halides and sulfonic acid halides.

10. The process for the production of new anthraquinone compounds comprising reacting at temperatures up to about 100° C. 1-amino-4-bromoanthraquinone-2-sulfonic acid with a compound selected from the group consisting of

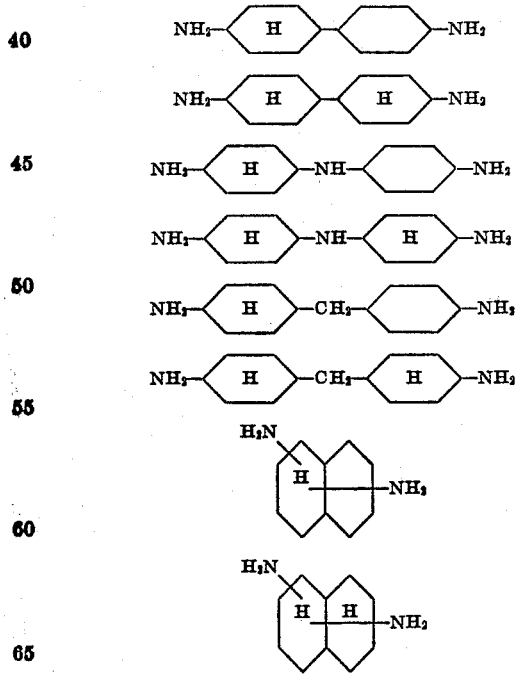

and acylating the obtained 1.4-diamino anthraquinone derivative with a compound selected from the group consisting of carboxylic acid halides and sulfonic acid halides.

11. The process for the production of a new anthraquinone compound comprising reacting at temperatures up to about 100° C. 1-amino-4-bromoanthraquinone-2-sulfonic acid with 1.4-diamino cyclohexane and acylating the obtained 1.4-diamino-anthraquinone derivative with acetyl chloride.

12. The process for the production of a new anthraquinone compound comprising reacting at temperatures up to about 100° C. 1-amino-4-bromoanthraquinone-2-sulfonic acid with 1.4-diamino cyclohexane and acylating the obtained 1.4-diamino-anthraquinone derivative with naphthalene-2-sulfochloride.

13. Compounds of the formula

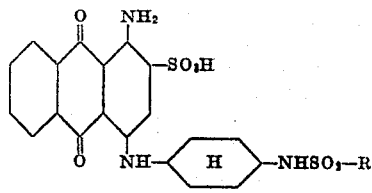

in which R is a monovalent radical.

References Cited in the file of this patent

UNITED STATES PATENTS

| | | |
|---|---|---|
| 2,067,469 | Wernand et al. | Jan. 12, 1937 |
| 2,430,771 | Kern | Nov. 11, 1947 |
| 2,453,285 | Von Allmen et al. | Nov. 9, 1948 |
| 2,517,613 | Von Allmen et al. | Aug. 8, 1950 |
| 2,541,623 | Von Allmen et al. | Feb. 13, 1951 |
| 2,616,900 | Von Allmen et al. | Nov. 4, 1952 |
| 2,659,736 | Von Allmen et al. | Nov. 17, 1953 |

FOREIGN PATENTS

| | | |
|---|---|---|
| 572,817 | Germany | Mar. 23, 1933 |